(12) United States Patent
Nozawa et al.

(10) Patent No.: US 12,123,760 B2
(45) Date of Patent: Oct. 22, 2024

(54) FLOW RATE CONTROL DEVICE, FLOW RATE CONTROL METHOD, CONTROL PROGRAM FOR FLOW RATE CONTROL DEVICE

(71) Applicant: Fujikin Incorporated, Osaka (JP)

(72) Inventors: Takahiro Nozawa, Osaka (JP); Takeshi Nakamura, Osaka (JP)

(73) Assignee: FUJIKIN INCORPORATED, Osaka (JP)

(*) Notice: Subject to any disclaimer, the term of this patent is extended or adjusted under 35 U.S.C. 154(b) by 438 days.

(21) Appl. No.: 17/610,759

(22) PCT Filed: Apr. 23, 2020

(86) PCT No.: PCT/JP2020/017480
§ 371 (c)(1),
(2) Date: Nov. 12, 2021

(87) PCT Pub. No.: WO2020/230574
PCT Pub. Date: Nov. 19, 2020

(65) Prior Publication Data
US 2022/0307882 A1    Sep. 29, 2022

(30) Foreign Application Priority Data
May 14, 2019 (JP) ................. 2019-091491

(51) Int. Cl.
*G01F 1/698* (2006.01)
*G05D 7/06* (2006.01)

(52) U.S. Cl.
CPC .......... *G01F 1/698* (2013.01); *G05D 7/0623* (2013.01)

(58) Field of Classification Search
CPC ....... G01F 1/696; G01F 1/698; G05D 7/0617; G05D 7/0623
See application file for complete search history.

(56) References Cited

U.S. PATENT DOCUMENTS

| 6,963,184 B2 | 11/2005 | Carlson |
| 7,073,392 B2 | 7/2006 | Lull et al. |

(Continued)

FOREIGN PATENT DOCUMENTS

| JP | H0916268 A | 1/1997 |
| JP | 2003157114 A | 5/2003 |

(Continued)

*Primary Examiner* — Erika J. Villaluna
(74) *Attorney, Agent, or Firm* — WC&F IP

(57) ABSTRACT

A flow rate control device having a high response accuracy is provided.
A flow rate control device includes a flow sensor measuring a flow rate of a fluid, and a controller adjusting the flow rate where the flow rate of the fluid to be a flow rate set value. The controller includes a control valve changing the flow rate, a drive circuit driving the control valve, a sensor response adjustment circuit adjusting a frequency response of a measured value of the flow sensor, and a first filter attenuating a predetermined frequency band of an output of the sensor response adjustment circuit. The drive circuit, the flow sensor, the sensor response adjustment circuit, and the first filter, configure a feedback loop. A deviation between the flow rate set value and an output of the first filter becomes an input to the drive circuit.

9 Claims, 3 Drawing Sheets

(56) References Cited

U.S. PATENT DOCUMENTS

| | | | |
|---|---|---|---|
| 7,603,186 B2 | 10/2009 | Smirnov | |
| 9,797,520 B2 | 10/2017 | Ohtsuki et al. | |
| 2011/0054702 A1* | 3/2011 | Smirnov | G05D 7/0635 |
| | | | 700/282 |
| 2017/0351274 A1* | 12/2017 | Nozawa | G05D 16/20 |

FOREIGN PATENT DOCUMENTS

| | | | |
|---|---|---|---|
| JP | 2005534110 A | 11/2005 | |
| JP | 2006500683 A | 1/2006 | |
| JP | 2008517404 A | 5/2008 | |
| JP | 2009535715 A | 10/2009 | |
| JP | 2011090405 A | 5/2011 | |
| JP | 2018156557 A | 10/2018 | |
| KR | 20090007470 A | 1/2009 | |
| WO | 2006045032 A2 | 4/2006 | |
| WO | 2007127897 A2 | 11/2007 | |
| WO | 2013/115298 A1 | 8/2013 | |

* cited by examiner

FLOW RATE CONTROL DEVICE, FLOW RATE CONTROL METHOD, CONTROL PROGRAM FOR FLOW RATE CONTROL DEVICE

TECHNICAL FIELD

The present invention relates to a flow rate control device, a flow rate control method, and a control program of the flow rate control device.

BACKGROUND ART

A flow rate control device and a mass flow controller (hereinafter, also referred to as "MFC") that adjust a flow rate of a fluid flowing downstream to a set value by adjusting a control valve based on the flow rate measured by a flow sensor are known.

Patent Document 1 discloses a flow rate control method of a fluid in a flow rate control device including a flow sensor coupled to a fluid flow path having an inlet side and an outlet side, where the flow sensor is adapted to provide a sensor output signal indicating a sensed fluid flow through the flow path, and the method includes methods for measuring at least one pressure in the flow path, and adjusting the sensor output signal based on measuring at least one pressure.

Patent Document 2 discloses a flow rate control device storing controlled parameters according to a plurality of flow rate set values and a plurality of fluid pressure values to a controller in advance, and controlling the flow rate by selecting the controlled parameters based on the flow rate set value and a detected value of a pressure sensor.

CITATION LIST

Patent Documents

Patent Document 1: JP 2005-534110 A
Patent Document 2: JP 2011-090405 A

SUMMARY OF INVENTION

Technical Problem

In MFC, in order to realize feedback control with a high response speed, response characteristics of the sensor that gives an input for control is one of important factors. As for a thermal MFC, a sensor is, for example, a thermal flow rate sensor. However, response characteristics of the thermal MFC are lower than theoretical values predicted from the response characteristics of the thermal flow rate sensor in actual measurement, and only a slow response with a time constant of about 10 seconds can be obtained. This is because a heat transport rate by the fluid such as gas flowing through the flow path is small with respect to a heat capacity of a sensor tube and a heat-generating resistor.

In the flow rate control devices described in Patent Documents 1 and 2, a pressure based MFC is disclosed. Neither device realizes a fast response speed feedback control in the MFC.

Therefore, one of the purposes of the present invention is to achieve a flow rate control device with a high response accuracy.

Solution to Problem

In order to achieve the above object, a flow rate control device according to one aspect of the present invention includes a flow sensor measuring a flow rate of a fluid, and a controller adjusting the flow rate where the flow rate of the fluid to be a flow rate set value. The controller includes a control valve changing the flow rate, a drive circuit driving the control valve, a sensor response adjustment circuit adjusting a frequency response of a measured value of the flow sensor, and a first filter attenuating a predetermined frequency band of an output of the sensor response adjustment circuit. The drive circuit, the flow sensor, the sensor response adjustment circuit, and the first filter, configure a feedback loop. A deviation between the flow rate set value and an output of the first filter becomes an input to the drive circuit.

Further, the controller may further include a second filter being outside of the feedback loop, amplifying a predetermined frequency band out of the output of the sensor response adjustment circuit, and not changing a gain of a frequency different from the frequency band.

Further, the sensor response adjustment circuit and the first filter may be analog filters processing analog signals.

Further, the flow sensor may be a thermal flow rate sensor.

In order to achieve the above object, a flow rate control method according to another aspect of the present invention uses a flow rate control device including a flow sensor measuring a flow rate of a fluid, a controller adjusting the flow rate where the flow rate of the fluid to be a flow rate set value, and a control valve changing the flow rate. The method includes a driving step driving the control valve, a measuring step measuring the flow rate, a sensor response adjusting step adjusting a frequency response of a measured value of the flow sensor, and an attenuating step attenuating a predetermined frequency band of an output of the sensor response adjusting step. The driving step, the measuring step, the sensor response adjusting step, and the attenuating step, configure a feedback loop, and a deviation between the flow rate set value and an acquired value of the attenuating step becomes an input to the driving step.

In order to achieve the above object, a control program of a flow rate control device according to another aspect of the present invention is the control program of the flow rate control device having a flow sensor measuring a flow rate of a fluid, a controller adjusting the flow rate where the flow rate of the fluid to be a flow rate set value, and a control valve changing the flow rate. The program executable on a computer includes a driving instruction driving the control valve, a measuring instruction measuring the flow rate, a sensor response adjusting instruction adjusting a frequency response of a measured value of the flow sensor, and an attenuating instruction attenuating a predetermined frequency band of an output of the sensor response adjusting instruction. The driving instruction, the measuring instruction, the sensor response adjusting instruction, and the attenuating instruction, configure a feedback loop, and a deviation between the flow rate set value and an acquired value of the attenuating instruction becomes an input to the driving instruction.

The computer program can be provided by downloading via a network such as the Internet, or can be recorded and provided on various computer-readable recording media such as a CD-ROM.

Effect of the Invention

According to the present invention, a high response accuracy can be provided.

PREFERRED EMBODIMENT

A flow rate control device and its control method and a control program according to embodiments of the present invention will be described below with reference to the drawings.

Overview of Flow Rate Control Device

Figure 1:
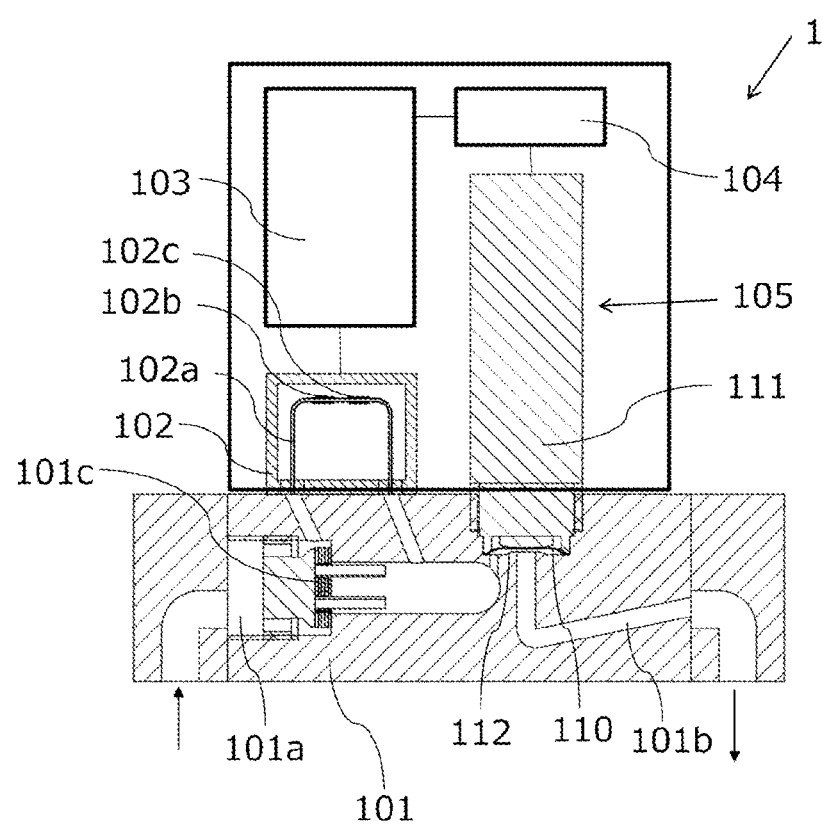
FIG. 1 is an overall schematic view illustrating an embodiment of the flow rate control device according to the present invention.

As illustrated in FIG. 1, a flow rate control device 1 includes a valve body 101, a flow sensor 102, a converter 103, a controller 104, and a control valve 105. The flow rate control device 1 is a device also called a mass flow controller (or referred to as "MFC").

The valve body 101 is a substantially tubular member that defines an upstream flow path 101a and a downstream flow path 101b. The upstream side of the upstream flow path 101a and the downstream side of the downstream flow path 101b are respectively connected to a pipe or a flow path block through which controlled fluid flows.

The upstream flow path 101a is a flow path that flows in from the fluid on the upstream side. The upstream flow path 101a branches into the flow path passing through the flow sensor 102 and the bypass flow path 101c on the way, then merges, and flows out to the control valve 105. The control valve 105 has a diaphragm 110 and a valve seat 112 facing to the diaphragm 110. A space between the diaphragm 110 and the valve seat 112 is a space that communicates between the upstream flow path 101a and the downstream flow path 101b. By deforming the diaphragm 110 with an actuator 111, the flow rate of the fluid can be adjusted by opening and closing the diaphragm 110 with respect to the valve seat 112. Although the internal structure of the actuator 111 is not illustrated in FIG. 1, the control valve 105, for example, is a piezo element driven type control valve that opens and closes a metal diaphragm by using a piezo element (piezo actuator) inside the actuator 111.

The downstream flow path 101b is configured so that the fluid, in which the flow rate is controlled by the control valve 105, flows in from the upstream side and flows out to the downstream side of the flow rate control device 1. The bypass flow path 101c is a flow path having a laminar flow element, which is a structure consisting of many narrow channels in parallel so that the fluid becomes laminar. In the present embodiment, the laminar flow element is configured by stacking a plurality of plates (bypass sheets) having grooves made by etching.

The flow sensor 102 is a sensor that measures the flow rate of the fluid flowing through a sensor tube 102a. The flow sensor 102 has, for example, heat-generating resistors 102b, 102c upstream and downstream of the sensor tube 102a, and converts the flow rate of the fluid through the sensor tube 102a into a voltage based on a difference in temperature of the heat-generating resistors 102b, 102c. Since a ratio of the flow rate in the bypass flow path 101c to the flow rate in the sensor tube 102a is known, the flow rate in the upstream flow path 101a can be calculated by measuring the flow rate in the sensor tube 102a. Although the flow sensor 102 has a limited range of measurable flow rate because its output value saturates as the flow rate increases, the flow sensor 102 can adjust the range of the flow rate of the upstream flow path 101a, that is, the measurable flow rate as the flow rate control device 1, by adjusting the bypass flow path 101c.

The converter 103 is a functional unit that converts the flow rate setting value into a state that can be compared with the output value of the flow sensor 102, and then outputs the flow rate setting value to the controller 104 together with the output value of the flow sensor 102. The converter 103 may rectify and amplify the output value of the flow sensor 102, or may lowpass filter the output value for noise rejection.

The converter 103 corrects a measurement error caused by a difference according to fluid types and an individual difference of the flow rate control device 1 with respect to the flow rate set value, and outputs a corrected value to the controller 104 as a sensor output target value.

The controller 104 is a functional unit that compares the output value of the flow sensor 102 with the sensor output target value and controls the control valve 105 based on the result of the comparison.

The controller 104 controls an opening position of the control valve 105 by performing feedback control so that the flow rate discharged from the downstream flow path 101b becomes the flow rate set value. The controller 104 has an internal CPU, an internal memory M, an internal A/D converter, and the like. The controller 104 may include a computer program configured to perform the operations described below and may be implemented by a combination of hardware and software.

Control Block Diagram of Flow Rate Control Device of Related Technology

Figure 4:
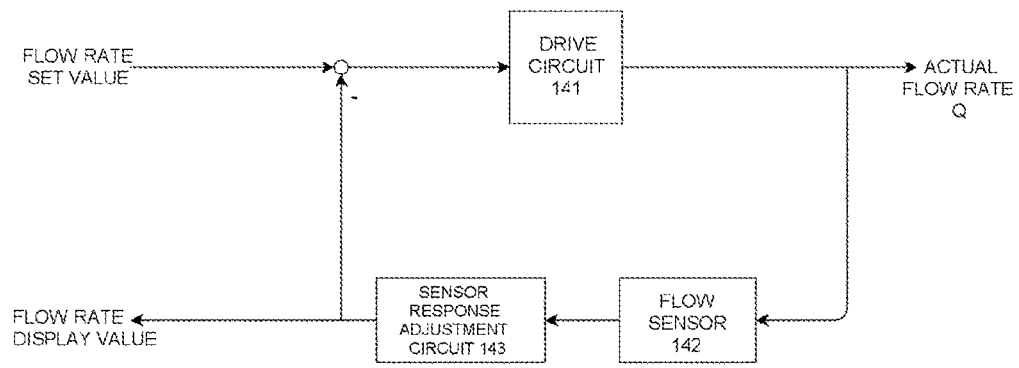
FIG. 4 is a control block diagram of the flow rate control device of the related technology.

As illustrate in FIG. 4, the flow rate control device of the related art has a drive circuit 141, a flow sensor 142 and a sensor response adjustment circuit 143 as control blocks.

The drive circuit 141 is a circuit that applies a driving current to the control valve 105. The drive circuit 141 opens and closes the control valve 105 based on an input flow rate set value, and changes an actual flow rate Q. The actual flow rate Q is the flow rate of the fluid physically flowing through the flow rate control device 1.

The flow sensor 142 measures the actual flow rate Q and inputs a voltage value corresponding to the actual flow rate Q into the sensor response adjustment circuit 143.

The sensor response adjustment circuit 143 is a circuit that corrects the frequency response of a measured value of the flow sensor 142. The sensor response adjustment circuit 143 is a band amplification filter having, for example, a large gain in a predetermined band and a gain in direct current of 0 dB.

The drive circuit 141, the flow sensor 142, and the sensor response adjustment circuit 143 are connected in this order to form the feedback loop. The deviation between the flow rate set value and an output value of the sensor response adjustment circuit 143 is input to the drive circuit 141. The drive circuit 141 drives the control valve 105 based on the deviation between the flow rate set value and the output value of the sensor response adjustment circuit 143. Further, an output of the sensor response adjustment circuit 143 is input to a display unit, which is not shown, and displayed as a flow rate display value indicating the current flow rate.

The guaranteed response speed in the flow rate control device of the related technology is, for example, about 1 second.

Figure 2:
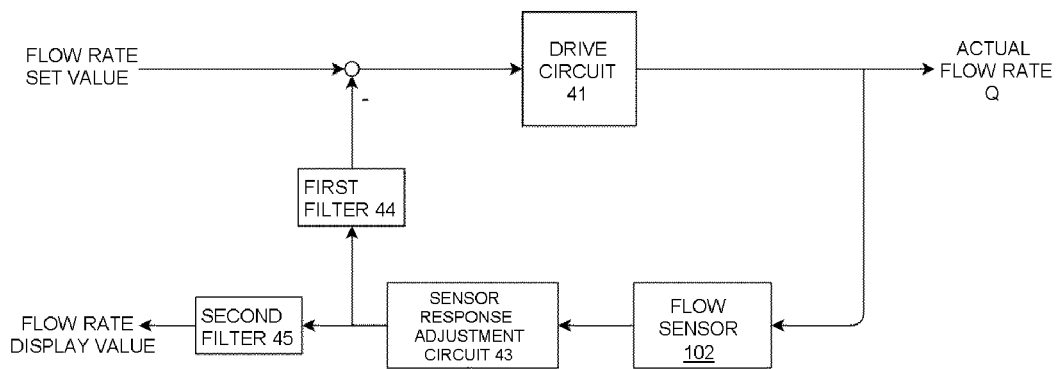
FIG. 2 is a control block diagram of the flow rate control device.

Control Block Diagram of Flow Rate Control Device 1 and Frequency Response of Each Filters As illustrated in FIG. 2, the flow rate control device 1 has the drive circuit 41, the flow sensor 102, the sensor response adjustment circuit 43, the first filter 44, and the second filter 45 as control blocks. The drive circuit 41, the flow sensor 102, the sensor response adjustment circuit 43, and the first filter 44 form the feedback loop in which the flow rate set value is input and the actual flow rate Q is output. The deviation between the flow rate set value and the output value of the first filter 44 is input to the drive circuit 41.

The drive circuit 41 is a circuit that applies the driving current to the control valve 105. The drive circuit 41 opens and closes the control valve 105 based on the input flow rate set value, and changes the actual flow rate Q. The actual flow rate Q is the flow rate of the fluid physically flowing through the flow rate control device 1.

The flow sensor 102 measures the actual flow rate Q and inputs the voltage value corresponding to the actual flow rate Q into the sensor response adjustment circuit 43.

The sensor response adjustment circuit 43 is a circuit that corrects the frequency response of the measured value of the flow sensor 102.

Figure 3:
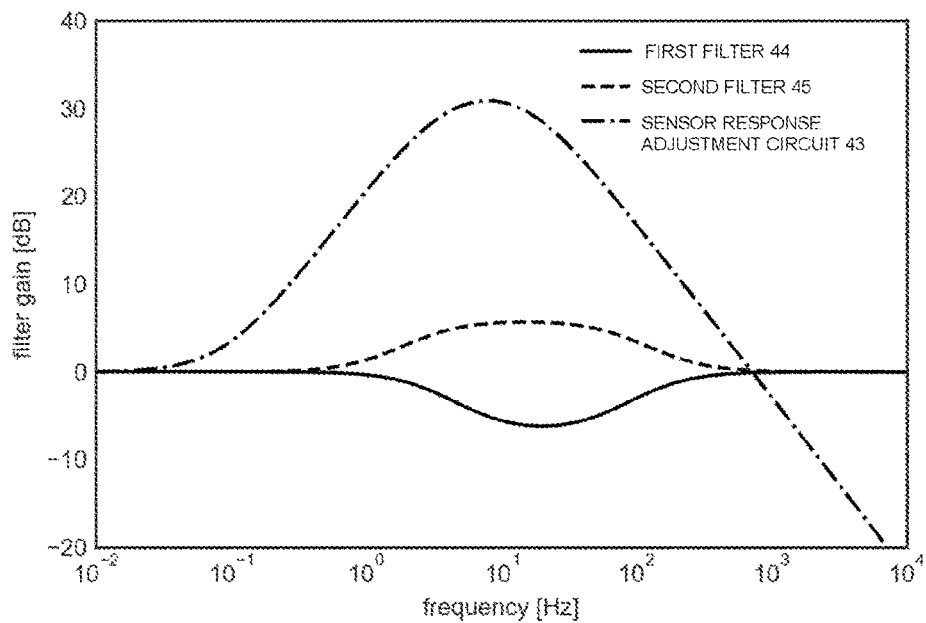
FIG. 3 is a Bode plot of the first filter, the second filter and the sensor response adjustment circuit included in the flow rate control device.

In the thermal flow rate sensor 102, when the heat transfer rate by the fluid such as gas flowing through the flow path is smaller than the heat capacity of the sensor tube 102a or the heat generating resistor, the heat transfer rate by the fluid becomes lower than the theoretical value and the measured value becomes broad. In other words, the measured value of the flow sensor 102 becomes a value obtained by applying a strong low-pass filter (hereinafter, also referred to as "LPF") to the actual flow rate Q. Therefore, as illustrated in FIG. 3, the sensor response adjustment circuit 43 is a band amplification filter having a gain in the cutoff band of the LPF to cancel the attenuation of the LPF caused by the flow sensor 102. Further, the sensor response adjustment circuit 43 may further have the property of a low-pass/high-cut filter that attenuates a high frequency side than an amplified frequency band.

The first filter 44 illustrated in FIG. 2 is a frequency filter to which the output of the sensor response adjustment circuit 43 is input. As illustrated in FIG. 3, the first filter 44 attenuates a predetermined frequency band of the output of the sensor response adjustment circuit 43. The first filter 44 does not change a gain of the frequency different from an attenuating frequency band. In other words, the gain of the frequency band other than the frequency band is approximately 1. A center frequency of the attenuating band in the first filter 44 is higher than the center frequency of a passband in the sensor response adjustment circuit 43.

Since the first filter 44 attenuates the predetermined frequency band and allows a signal in a low frequency band to pass, the first filter 44 exhibits a behavior such that an input signal is output with a delay in a situation where the signal is monotonically changing. Therefore, in this feedback loop, the deviation between the signal delayed from the actual flow rate Q and the flow rate set value is taken. When considering the transient response in which the actual flow rate Q gradually approaches the flow rate set value, the delayed signal has a larger deviation from the flow rate set value than the actual flow rate Q, so that the drive of the control valve 105 can be increased as compared with the case where the first filter 44 is not used. Therefore, the feedback control can be accelerated, and the response speed can be accelerated. The response speed of the flow rate control device 1 is, for example, about 0.5 seconds, which is about 2 times faster than the flow rate control device of the related technology without the first filter 44. According to this configuration, it is possible to quickly respond to the transient response specifically when the flow rate setting value is largely changed.

The second filter 45 is a frequency filter into which the output of the sensor response adjustment circuit 43 is input, and is arranged outside the feedback loop. The output of the second filter is input to the display unit (not shown). The display unit displays the current flow rate calculated based on the output of the second filter 45 as the flow rate display value. The display unit may have a configuration of the flow rate control device 1, or may be provided in an external device connected to the flow rate control device 1.

As illustrated in FIG. 3, the second filter 45 amplifies a predetermined frequency band in the output of the sensor response adjustment circuit 43, and does not change the gain of the frequency different from the frequency band. The center frequencies of the first filter 44 and the second filter 45 are approximately the same.

Since the second filter 45 amplifies the frequency in a predetermined band, the change of the signal is emphasized in a time domain. In addition, since the value is corrected in a changing direction in a situation where the input value monotonically changes, it can be expressed that the signal is accelerated by passing through this filter. According to the configuration of calculating the flow rate display value based on the output value of the second filter 45, by accelerating the output signal of the sensor response adjustment circuit 43, a value more accurately reflecting the actual flow rate Q can be displayed as the flow rate display value.

The sensor response adjustment circuit 43, the first filter 44, and the second filter 45 may be analog filters that process analog signals. According to this configuration, it can be configured at a low cost and can be processed at high speed with low power consumption as compared with the case where it is configured by a digital circuit such as a microcomputer.

Both the sensor response adjustment circuit 43 and the second filter 45 are BPFs that amplify a predetermined band. Here, if the frequency response obtained by combining the characteristics of the sensor response adjustment circuit 43 and the second filter 45 is realized by one circuit, the frequency response may become steep and noise may be generated. According to the configuration in which the output value of the flow sensor 102 is used for calculating the flow rate display value via the sensor response adjustment circuit 43 and the second filter 45, a signal-to-noise ratio (SN ratio) can be guaranteed.

The first filter 44 and the second filter 45 are filters having the frequency response opposite to each other in the sense that the positive and negative gains are different. The sensor response adjustment circuit 43 and the first filter 44 also have the frequency response that is substantially opposite to each other, although the center frequency is different. If filters having the frequency response opposite to each other are applied to the same signal, the signal amplified once will be attenuated, which is undesirable in maintaining the SN ratio. According to the configuration in which the output from the sensor response adjustment circuit 43 is branched and the first filter 44 and the second filter 45 are arranged on the respective paths, the use of the filter having the opposite frequency response is minimized and the SN ratio can be ensured.

Further, according to the configuration in which the sensor response adjustment circuit 43, the first filter 44 and the second filter 45 are separate control blocks, the signal can be controlled by the voltage width applied to each analog element even when the sensor response adjustment circuit 43, the first filter 44 and the second filter 45 are configured by analog circuits.

As described above, according to the flow rate control device according to the present invention, it is possible to provide a flow rate control device with a high response accuracy.

Further, according to the flow rate control device according to the present invention, it is possible to indicate a value that is more accurately reflects the actual flow rate as the flow rate display value by calculating the flow rate display value based on the output value of the second filter.

Furthermore, according to the flow rate control device according to the present invention, it is possible to configure at a low cost as compared with a case where the frequency filter is configured with a digital circuit as a microcomputer, for example, and to perform processing at a high speed with low power consumption, by configuring each frequency filter with an analog filter.

Further, according to the flow rate control device according to the present invention, high response accuracy can be realized even when the flow sensor is the thermal flow rate sensor.

1 flow rate control device
41 drive circuit
43 sensor response adjustment circuit
44 first filter
45 second filter
102 flow sensor
104 controller
105 control valve

The invention claimed is:

1. A flow rate control device, comprising:
a flow sensor configured to measure a flow rate of a fluid and output a measured value; and
a controller configured to adjust the flow rate of the fluid to be a flow rate set value;
wherein the controller comprises:
a control valve configured to change the flow rate;
a drive circuit configured to drive, in response to a drive circuit input, the control valve;
a sensor response adjustment circuit configured to perform an adjusting of a frequency response of the measured value of the flow sensor, the adjusting comprising a band amplification filtering of the measured value, the band amplification filtering having a passband and comprising, over the passband, a gain, and outputting an output signal; and
a first filter configured to attenuate an attenuating frequency band of the output signal of the sensor response adjustment circuit and to output a resulting first filter output, the attenuating frequency band being within the passband of the band amplification filtering;
wherein the drive circuit, the flow sensor, the sensor response adjustment circuit, and the first filter are arranged as a feedback loop; and
wherein the controller is further configured to generate the drive circuit input based on a deviation between the flow rate set value and the first filter output.

2. The flow rate device according to claim 1, further comprising a second filter, arranged outside of the feedback loop and configured to amplify a predetermined second filter frequency band out of the output signal of sensor response adjustment circuit, and to not change a gain of a frequency different from the passband.

3. The flow rate control device according to claim 1, wherein the sensor response adjustment circuit and the first filter comprise analog filters configured to process analog signals.

4. The flow rate control device according to claim 1, wherein the flow sensor comprises a thermal flow rate sensor.

5. The flow rate control device according to claim 1, wherein the passband of the band amplification filter is aligned to a first center frequency, the attenuating frequency band of the first filter is aligned to a second center frequency, and the second center frequency is higher than the first center frequency.

6. A flow rate control method using a flow rate control device comprising a flow sensor configured to measure a flow rate of a fluid, a controller configured to adjust the flow rate of the fluid to be a flow rate set value, and a control valve configured to change the flow rate, the method comprising:
a step of driving, based on a drive input signal, the control valve;
a step of measuring, by the flow sensor, the flow rate and outputting a measured value;
a step of adjusting a frequency response of the measured value of the flow sensor, the adjusting comprising a band amplification filtering of the measured value of the flow sensor, the band amplification filtering having a passband and comprising, over the passband, a gain, and outputting an output signal;
an attenuating filtering step comprising an attenuating of an attenuating frequency band of the output signal of the step of adjusting the frequency response of the measured value and outputting a corresponding attenuating filter output; and
generating the drive input signal based on a deviation between the flow rate set value and the attenuating filter output,
wherein the step of driving, the step of measuring, the step of adjusting the frequency response of the measured value of the flow sensor, and the attenuating filtering step, are configured as a feedback loop.

7. The flow rate control method according to claim 6, wherein the passband of the band amplification filter is aligned to a first center frequency, the attenuating frequency band is aligned to a second center frequency, and the second center frequency is higher than the first center frequency.

8. A non-transitory computer-readable storage medium that stores a computer-executable program of instructions for causing a computer that is connected to a flow sensor configured to measure a flow rate of a fluid, and connected to a control valve configured to change the flow rate in response to a drive input signal from the computer, to adjust the flow rate of the fluid to be a flow rate set value, the program comprising:
a measuring instruction configured to cause the computer to measure, the flow rate as a measured value from the flow rate sensor;
a sensor response adjusting instruction configured to cause the computer to adjust a frequency response of the measured value of the flow sensor, by operations including band amplification filtering of the measured value, wherein the band amplification filtering includes a passband and, over the passband, a gain and generating a resulting output signal;

an attenuating instruction configured to cause the computer to attenuate an attenuating frequency band of the output signal of the sensor response adjusting instruction;

wherein the driving instruction, the measuring instruction, the sensor response adjusting instruction, and the attenuating instruction, configure a feedback loop; and wherein the driving instruction is configured to drive the control valve based on a deviation between the flow rate set value and a result of the attenuating instruction.

9. The non-transitory computer-readable storage medium of claim 8, wherein the passband of the band amplification filter is aligned to a first center frequency, the attenuating frequency band is aligned to a second center frequency, and the second center frequency is higher than the first center frequency.

* * * * *